Nov. 22, 1932.   A. F. JENKINS   1,888,385
TIP FOR OXY-ACETYLENE TORCHES
Filed April 4, 1931
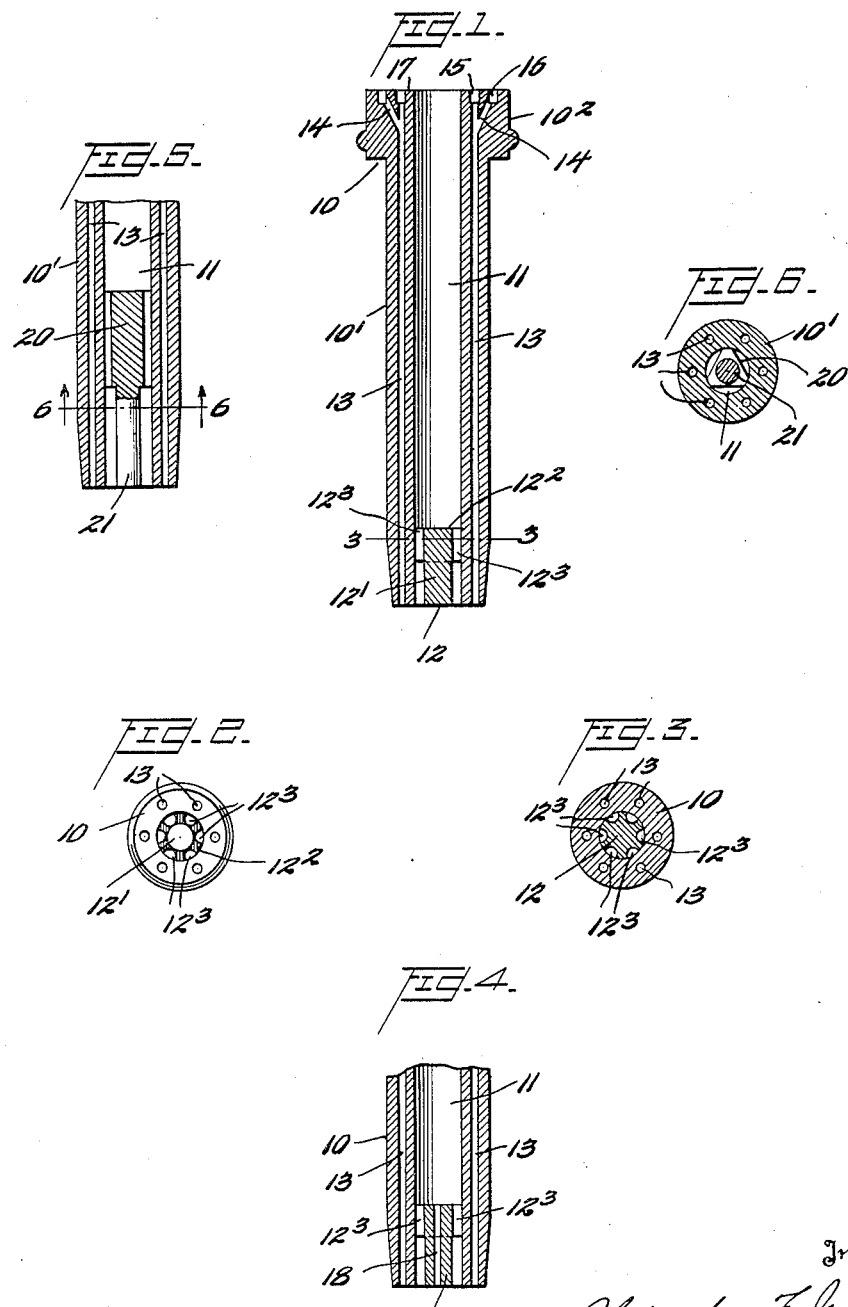

Patented Nov. 22, 1932

1,888,385

UNITED STATES PATENT OFFICE

ALEXANDER F. JENKINS, OF BALTIMORE, MARYLAND

TIP FOR OXY-ACETYLENE TORCHES

Application filed April 4, 1931. Serial No. 527,789.

The present invention relates to cutting torches and particularly to tips for such torches.

Various types of cutting torches have heretofore been designed or suggested. Generally, for cutting purposes, a tip is used which is provided with a central passage for oxygen and one or more laterally disposed passages for combustible gases. The combustible gases issuing from the discharge ports of the tip are ignited, and the flames resulting from the ignition of these gases constitute heating flames whereby a piece of steel or other metal may be raised to such temperature that the oxygen issuing from the central jet can combine therewith to rapidly oxidize the heated metal, quickly burning it away. Usually also the issuing jet of oxygen is of relatively small cross section and under relatively high pressure, so that the cut made by the action of the torch is relatively narrow.

It has also been proposed that, where it is desired to cut or burn away comparatively large areas of metal, it is desirable to increase the area of the passageway provided for conducting the cutting oxygen to the discharge end of the tip and to restrict this passage at its rear end so that the issuing jet of oxygen is of relatively low velocity.

The present invention relates to the class of cutting or burning tips last mentioned but differs widely in structure from those heretofore designed or suggested. Thus, instead of restricting the passage for the cutting oxygen at its rear end, it is made relatively large at its rear end and restricted at its forward end, that is, adjacent the oxygen discharge port.

The invention also contemplates a novel form of port for discharging the oxygen against the work. The oxygen discharge port contains a device or member preferably formed separately from the tip and inserted in the forward end of the oxygen passage by a pressing operation. Preferably also I so design this member that the oxygen is delivered through an annular discharge port so that the jet of issuing oxygen is in the form of a hollow stream. By this means, large quantities of oxygen are delivered over a relatively large area to the surface which has already been highly heated by the heating gas jets. As the oxygen stream contacts with a large area of this heated surface, a large area of such surface is burned away. By means of a device of this type, holes of considerable size may be burned rapidly through metallic members, rivet heads removed by burning, and other similar operations performed with speed and facility. Furthermore, in performing such operations as piercing plates, removing rivets, etc., a minimum quantity of oxygen is used in proportion to the mass of metal burned away.

The invention may have various embodiments, and in the accompanying drawing two such embodiments are illustrated. It will be appreciated, however, that the forms illustrated and hereinafter described in detail are set forth by way of example only.

In the drawing:

Figure 1 is a longitudinal section through the novel torch tip;

Figure 2 is an end view thereof;

Figure 3 is a section on line 3—3 of Figure 1;

Figure 4 is a partial section through a slightly modified form of tip;

Figure 5 is a longitudinal axial section through the discharge end of a modified form of tip; and Figure 6 is a section on line 6—6 of Figure 5.

The tip body is indicated at 10, and this body comprises the usual customary cylindrical, or nearly cylindrical, portion $10'$ and the enlarged portion $10^2$, by means of which it may be readily clamped to the head of a torch by the usual coupling customarily employed for this purpose. Passing axially through the tip is the cylindrical oxygen passage 11. This passage 11 is relatively large in cross section as compared with the oxygen passages in the customary and usual tip primarily intended for cutting relatively narrow slots in metallic members.

As will be clearly seen from Figure 1 of the drawing, a member 12, in the nature of an oxygen jet shaping or defining member, is positioned in the passageway 11 adjacent the discharge end. Member 12 comprises a forward cylindrical portion 12' the diameter of which is somewhat less than the diameter of oxygen passage 11 at that point, together with a portion $12^2$, by means of which it is supported axially in passageway 11, leaving an annular channel for the passage of oxygen between the concentric cylindrical walls of member 12 and passage 11.

Portion $12^2$ of member 12 is formed generally as a cylinder, the outside diameter of which is equal to the inside diameter of passage 11. This cylindrical portion $12^2$ of member 12 is preferably formed integral with cylindrical portion 12' and is exteriorly and longitudinally grooved at a plurality of points. In the drawing member $12^2$ is shown to have six longitudinal grooves $12^3$ formed therein. These grooves serve to conduct oxygen past the portion $12^2$ of member 12 and to discharge it into the annular space between portion 12' thereof and the wall of passageway 11. The cylindrical surfaces of member 12' fit tightly against the cylindrical wall of passageway 11, and the member is thereby retained frictionally in the position in which it is shown in the drawing.

A plurality of relatively small conduits 13 extend through the tip from one end to the other, these conduits being adapted to convey heating gases, and the discharge ends of the conduits being disposed equidistantly from the axis of the tip and the axis of the cylindrical member 12. As I preferably form the combustible mixture in the tip itself, these passages are intersected adjacent their rear ends by branch passages 14. Both the straight passages 13 and branch passages 14 terminate in grooves, indicated at 15 and 16 respectively, these grooves being concentric and cut in the seating surface 17 of the tip, which surface is adapted to be seated firmly against a similar surface of the head of the torch. A port in the head of the torch delivers oxygen to the groove 15, and a second port in register with groove 16 delivers acetylene, hydrogen, or other combustible gas. These gases are brought together at the junction of ducts 13 and 14 and are caused to intermingle in their passage toward the discharge ports of ducts 13.

As shown in Figure 4, I may provide a modified form of restricting member, such as is indicated at $12^a$, this member having a central oxygen duct 18 whereby a relatively small jet of oxygen may be discharged axially from the torch in addition to the annular stream of outflowing gas. Additional ports such as 18 may be provided if desired. The tip described is very effective in operation, enabling the operator to cut clean circular holes in a body of metal with minimum expenditure of oxygen.

In the form of tip illustrated in Figures 5 and 6, that portion 20 of the restricting device which supports the cylindrical member 21 is triangular in cross section, with rounded corners which engage the wall of the oxygen conduit. The restricting member is retained in position frictionally, as in the case of the form first described. The oxygen passes through the ducts between the flat faces of the portion 20 and the cylindrical wall of the bore. This form of restricting device may be easily made and assembled with no difficulty by pressing the same into the oxygen passage.

For special purposes the design and arrangement of the several elements of the invention may be modified in other respects without departure from the principles thereof.

Having thus described the invention, what is claimed as new and desired to be secured by Letters Patent is:—

1. A tip for a torch having passages for heating gases and a passage for oxygen, the discharge port for the oxygen passage being substantially annular whereby a stream of oxygen of annular cross section is discharged therefrom, the heating gases being discharged exteriorly of the annular oxygen stream.

2. A tip for a torch having a plurality of heating gas passages with discharge ports equidistantly spaced from a common center and a passage for oxygen having an annular discharge port concentric with said center, the heating gas ports being located without the oxygen discharge port.

3. A tip for a torch having passages for heating gases, a passage for oxygen, the oxygen passage being relatively large and of substantially the same cross section throughout, and a member supported centrally in said oxygen passage adjacent the discharge end thereof whereby the escaping oxygen is caused to be discharged from the tip in a hollow stream, the wall of said restricting device being spaced from the wall of the passage, said walls therefore defining between them an annular oxygen discharge port.

4. A tip for a torch having passages for heating gases, a passage for oxygen in the form of an elongated cylindrical conduit of relatively large cross section, the rear end of said passage being unrestricted, and a cylindrical member positioned concentrically in said passage adjacent the discharge end thereof, the cylindrical wall of said member being spaced from the cylindrical wall of the passage, and said member having means engaging the wall of said passage to retain the same in such position.

5. A tip for a torch having lateral passages for heating gases and a central passage for oxygen, said oxygen passage being relatively large in cross section and having a gas flow restricting device positioned centrally therein adjacent the discharge port, the wall of said restricting device being spaced from the wall of the passage, said walls therefore defining between them an annular oxygen discharge port.

In testimony whereof I hereunto affix my signature.

ALEXANDER F. JENKINS.